Aug. 4, 1931.  R. W. SCHROEDER  1,817,651
AIRPLANE AND METHOD OF CONTROL
Filed July 16, 1928   6 Sheets-Sheet 2

Aug. 4, 1931.   R. W. SCHROEDER   1,817,651
AIRPLANE AND METHOD OF CONTROL
Filed July 16, 1928    6 Sheets-Sheet 5

Patented Aug. 4, 1931

1,817,651

UNITED STATES PATENT OFFICE

RUDOLPH W. SCHROEDER, OF GLENCOE, ILLINOIS

AIRPLANE AND METHOD OF CONTROL

Application filed July 16, 1928. Serial No. 293,219.

This invention relates to airplanes and method of control. It has among its objects to provide an airplane with wings formed of two or more articulated sections from front to rear, constructed and arranged for relative movement between sections to vary the camber of the wings by varying or changing the chord line; to provide a plane with wings of the character just described, in which the variation in the camber and in the relative position of the chord line will be automatically effected upon manipulation of the airplane controls to produce or obtain desired operating conditions; to provide an airplane having an adjustable stabilizer, the negative angle of which will be automatically increased upon throttling down of the motor to compensate for the lessened negative effect of the stabilizer resulting from the cessation of the propeller "slip-stream"; to provide an airplane with wing construction of the character just described in which the car, fuselage, or body is rigidly secured to the front or nose wing sections; to provide an airplane in which the angular relation between the car-body or fuselage and the earth is normally maintained relatively constant during variations in the movement of the plane relative to the earth; to provide an airplane with wing sections of variable camber, the variation of which camber is effected by manipulation of the elevators and/or the horizontal stabilizer; to provide an airplane with wings of variable camber, the variation of which may be effected by manipulation of either the throttle or the stick control or both; to provide an airplane with movable horizontal stabilizer or stabilizers, movement of which may be effected by manipulation of the throttle control; to provide an airplane with wings of variable camber, such plane being so constructed and arranged as to control its conditions of flight as to ascent, descent or level flying by variation in the camber of the wings rather than by angular variation or inclination of the entrance portion of the wings and the fuselage relative to the earth; to provide an airplane with wings of variable camber and so constructed and arranged that the angle of attack may be varied without variation in the angular relation of the body or fuselage with respect to the earth; and in general to provide an airplane of novel construction and operation which will permit relatively rapid ascent and relatively steep descent, the latter at a sharp angle at relatively lesser and therefore safer landing speed than is possible with present-day planes. Another object of my invention is to provide an airplane of a construction such that during flight it will automatically tend to maintain its air speed constant without manipulation of the controls; also to provide an airplane of such construction that the major forces acting thereon, at least during normal flight conditions, will intersect at a common center or intersection or substantially so, so that moments will be substantially eliminated, or minimized to a point readily taken care of in the operation of the plane. Another object consists in a new and novel method of control of airplanes. The above and other objects will be more fully apparent and set forth in the following specification and shown in the accompanying drawings, in which:

In the embodiment shown, my airplane comprises generally wings each formed of a plurality of articulated sections, the fuselage and its accessories being rigidly attached to the front wing sections with the power plant, and being further provided with a tail structure movable with the intermediate wing section, horizontal stabilizers and elevators being provided in conjunction with the usual controls and being further arranged to vary the camber and chord line of the wings under certain conditions, this variation being dependent in so far as the stabilizers are concerned on the position of the throttle.

It is well known to those skilled in the art that airplane wings can be constructed with a camber or with an arrangement of chord line that will render them particularly adapted either for relatively high speed or relatively great lift or for moderate speed and lift, but it has been practically impossible heretofore to obtain all of these results with one construction. It is obvious that quick lift or rise in starting is desirable, but the wing construction which would produce such a result is not adapted to efficient speed due to the consequent drag. Similarly, ability to descend at a relatively sharp angle and at slow speed is desirable since it permits landing in more confined areas than are now required.

My invention obtains these beneficial results, i. e., the ability to fly at high speed efficiently and the ability to rise and descend at relatively sharp angles, the landing being performed at relatively slow speed. In addition to obtaining these results I have provided novel means for accomplishing them automatically in conjunction with the operation of the necessary controls of the plane.

Figure 3:
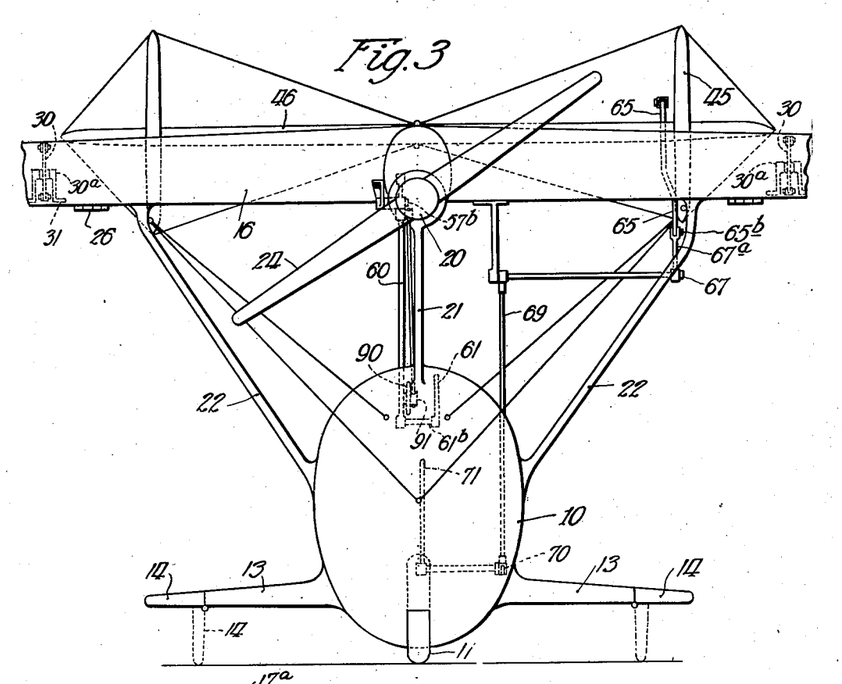
Fig. 3 is a front elevation of the central portion of the plane illustrated in Fig. 1.
Figure 4:
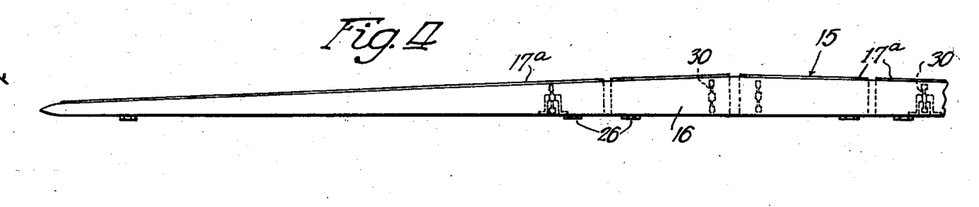
Fig. 4 is a front elevation with a greater portion of the wing of the plane illustrated in Fig. 1.

In the embodiment of my invention illustrated in the accompanying drawings, 10 designates the car or body having the landing wheels 11 arranged fore and aft along the vertical median plane of the body, which is further provided with the laterally projecting cambered stub wings 13 having the pivoted supporting tips 14 movable to and from supporting position, which is illustrated in dotted lines in Fig. 3, by any suitable control means (not illustrated).

Wings generally indicated by numeral 15 extend from either side of the center line of the structure and these wings are each formed of three articulated sections, the front or nose section 16, the intermediate section 17, and the trailing section 18. The nose sections 16 are formed with the motor block or housing 20, and rigid struts 21, 22 and 23 serve to secure the body or car 10 to the nose sections 16. A vertical strut 21 extends from the motor housing and is rigidly secured to the car 10 also, so that the power plant, its housing, the wing nose sections 16 and the car 10 form a rigidly connected unified structure. The usual rotatable propeller 24 is located at the front of the housing 20, a tractor type of plane being illustrated in the embodiment shown.

Figure 2:
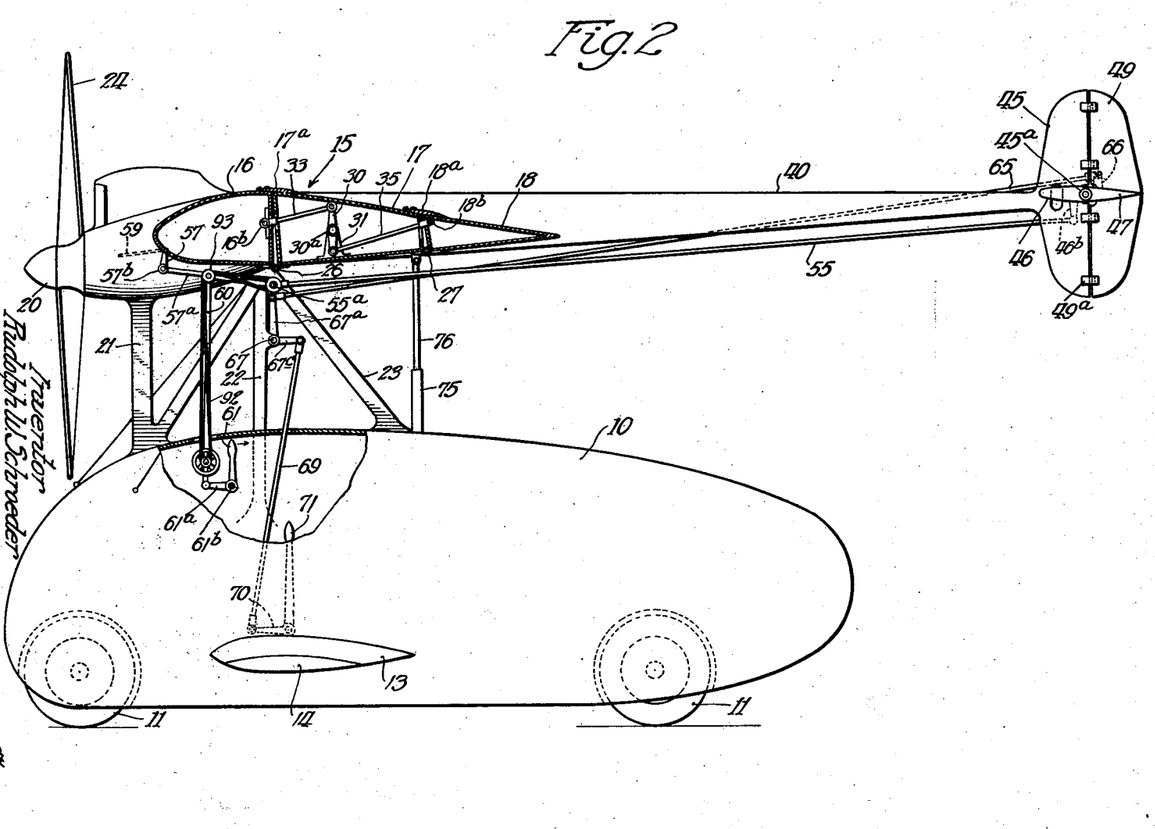
Fig. 2 is a vertical section along line 2—2 of Fig. 1.

Hingedly connected to or associated with the wing nose sections are the intermediate sections 17, shown in the drawings as connected by the hinge 26 in such wise as to slightly space the adjacent lower edges of the nose and intermediate sections (see Fig. 2). In the form shown, the nose sections are provided with a sheathing $17^a$ to partially overlie the upper surface of the intermediate sections 17 to prevent the formation of an open gap or recess between the nose and intermediate sections as the latter are hingedly moved from the former.

The trailing sections 18 are similarly hingedly connected through hinges 27 to the intermediate sections 17 which are similarly provided with sheathing $18^a$ partially overlying such trailing sections. The intermediate sections, in the form illustrated, are provided with interiorly located crank arms 30 pivoted intermediate their extremities at $30^a$ to the brackets 31. Connecting rods 33 extend from the upper end of crank arms 30 to the rear of the nose sections 16 to which they are pivotally connected at $16^b$ (see Fig. 2). The front wall of the intermediate sections 17 and the rear walls of the nose sections 16 are suitably apertured to permit the movement of the rods 33. Similarly, connecting rods 35 are pivotally connected to the lower ends of the crank arms 30 and extend therefrom to pivoted connection with the trailing sections 18 at points $18^b$. It will be apparent that upon movement of the intermediate sections 17 relative to the nose sections 16, for example, such movement will be transmitted in a definite ratio to the trailing sections 18. This ratio may be selected as desired by proper dimensioning and pivotal location of the crank arms 30.

Figure 1:
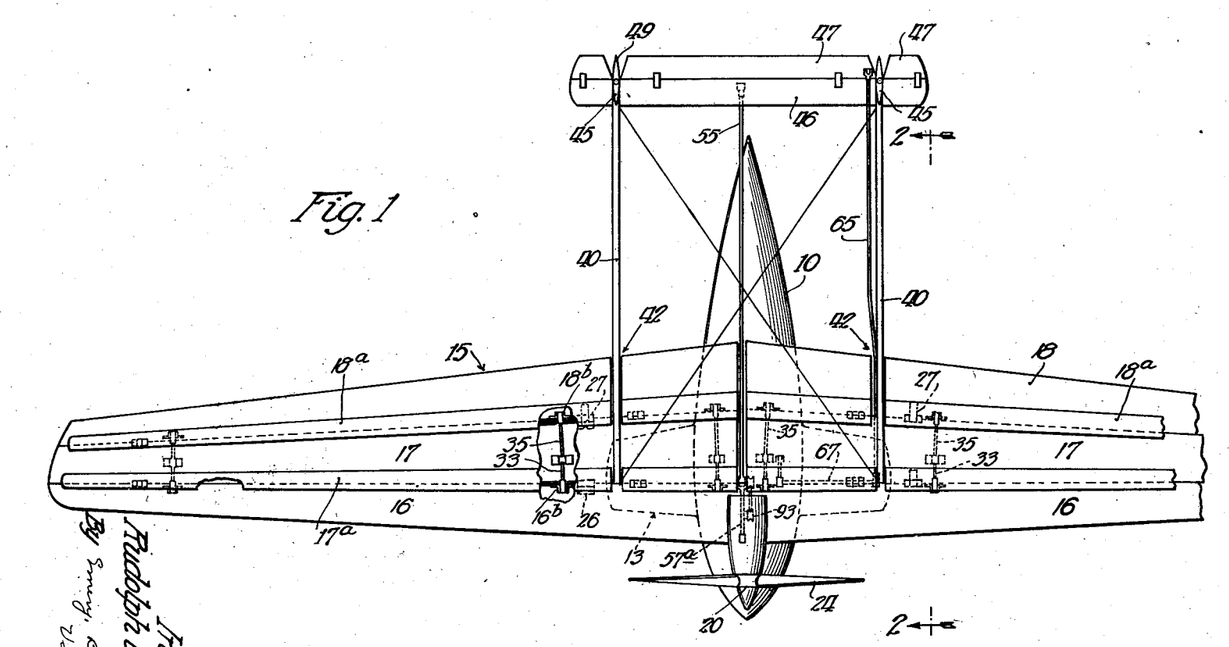
Fig. 1 is a plan view of an airplane embodying my invention.

Rigidly secured to or formed with the intermediate wing sections are the tail booms 40 shown as two in number spaced apart as illustrated in Fig. 1, for example. The trailing wing sections 18 are separated or interrupted to provide spaces 42 for the free relative movement of the tail booms 40.

Formed with each of the tail booms at the rear end thereof is a rudder fin 45 extending above and below the boom. Extending between and through these fins is the horizontal bar $45^a$, upon which is pivotally mounted the horizontal stabilizer 46 having a crank arm $46^b$ for actuation as described below. The stabilizer is provided with the beam $46^a$, the fins 45 being slotted at $45^b$ to accommodate its movement. Located rearwardly of and preferably complementary in section is the elevator 47 also interrupted to accommodate the vertical rudders 49 which are in alignment with the fins 45, being secured thereto by hinge straps 49ª or the like. A cross beam 47ª is provided for the elevator sections, and the rudders 49 are recessed or cut away at 49ᵇ to accommodate the necessary movement of the beam 47ª, which is also provided with a crank arm 66, the purpose of which is described below.

The tail booms 40 being inwardly and rigidly formed with the intermediate wing sections 17, it will be apparent that such wing sections and the entire tail structure may rotate about their pivotal mountings relative to the nose sections 16 and the car 10, which rotation will also result in a differential movement of the wing trailing sections 18 with respect to both the nose sections and the intermediate wing sections.

The stabilizers 46 are controlled through the rods 55 which are pivotally attached at one end, in the form illustrated, to brackets 46ᵇ, which in turn are secured to the stabilizers 46. These rods lead forwardly to a pivotal connection at their other ends at 55ª to one end of arm 57ª of bell-crank 57, which is pivotally mounted on the motor housing or other suitable location at 57ᵇ. The other arm 57ᶜ of bell-crank 57 is utilized to transmit movement through the rod 59 to the throttle or carburetor control of the motor. It should be noted that the pivotal axis or point 55ª may be moved along an arc upon which also lies the axis or point 26 of hinged connection between the nose and the intermediate wing sections. Pivotally connected at 57ᵈ to the bell-crank arm 57ª, intermediate its extremities, is a vertically mounted link 60 which leads to the arm 61ª of throttle control handle 61 pivoted at 61ᵇ. This control handle 61 when moved to the right as viewed in Fig. 2, opens the throttle and simultaneously raises the pivotal point 55ª to or toward coincidence with the hinged axis 26.

With the tail full out, movement of the throttle from open to closed position has little or no effect upon the stabilizer. With the tail depressed, however, movement of the throttle control from open to closed position effects a very appreciable movement of the stabilizer and increases its negative effect markedly, i. e., its negative angle relative to the tail axis.

It is the inventor's idea to maintain the center of gravity at all times in advance of the center of pressure of the wing. While this center of pressure may move toward the center of gravity as the speed of the plane decreases, there is always a diving moment caused by the distance between the center of gravity and center of pressure. When the engine speed is reduced, the down flow from the propeller upon the stabilizer is greatly decreased, and it is desirable to enhance its negative relation to balance or neutralize the diving moment, and this enhancing or added depression of the stabilizer is made necessary by this decrease or cessation of the down flow.

In the present-day planes, it is almost necessary to effect a manual adjustment or trimming of the stabilizer to meet this condition upon landing, as otherwise the enhanced "nose-heavy" effect must be met by increased force upon the elevator control.

The elevators 47 are manipulated and controlled through the rod 65 which is pivotally attached at 65ª to bracket 66 secured to the elevators 47. At its other end the control rod 65 is pivoted at 65ᵇ to arm 67ª of bell-crank 67, which is pivoted at 67ᵇ. To the other arm 67ᶜ is pivotally attached the link 69 connected to the angularly disposed arm 70 of the control stick 71.

To check vibratory movement a dash-pot 75 of any suitable construction is located on the car 10 or elsewhere, and with this coacts the plunger 76 pivotally attached at its upper end to an intermediate wing section 17.

Figures 5, 6:
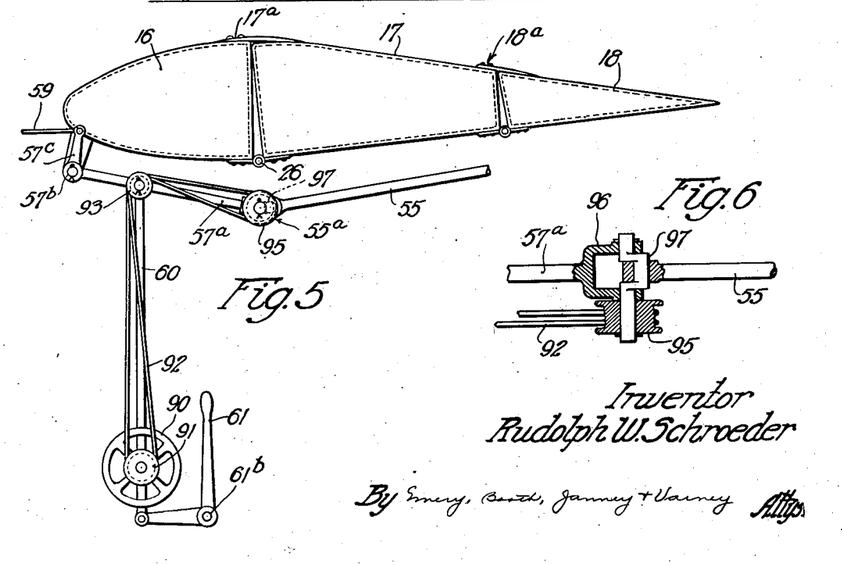
Fig. 5 is a side elevation of a detail of the stabilizer adjusting means.
Fig. 6 is a plan view of a portion of the structure shown in Fig. 5.

It may be desirable to vary the normal relative position of the horizontal stabilizer to accommodate variation in the load in the car or for other reasons, and for this purpose I have disclosed the following apparatus. Upon the vertical link 60 is provided a rotatable hand-wheel 90 provided with a sheave or pulley 91 around which are carried several turns of an endless cable or rope 92, the runs of which in turn run over a pair of freely rotatable pulleys 93 at the intersection of link 60 and arm 57ª. This cable 92 runs around a sheave or pulley 95 which is pivotally supported by a bifurcated bracket 96 at the end of the arm 57ª. Formed with the shaft of the pulley 95 is the eccentric cam 97 which is journaled in the end of the rod 55. The above structure, as will be obvious, permits rotation through the medium of the hand-wheel 90, of the cam 97 which in turn acts through the rod 95 and arm 46ª to vary the normal position of the horizontal stabilizer.

The motor and propeller are preferably so arranged that the line of power application passes through or near the hinge line 26. The car and associated structure which are rigidly secured to the wing nose sections 16 are also preferably constructed and arranged so that the center of gravity thereof with the pilot therein lies directly beneath or almost directly beneath the hinge line 26, and it will be apparent that any forces transmitted through the tail booms to the wings will act through the hinge line 26. By this construction I therefore substantially eliminate or reduce moments through which these various forces might otherwise act to unbalance the plane in its travel, and I am therefore enabled to use a shorter and lighter tail structure and am able to advance my front wheel to the landing point an appreciable distance in advance of the center of gravity so as to obviate danger of nosing over on landing. Numerous other advantages in operation and performance also result from this substantial elimination or minimizing of such moments.

It will be apparent with the structure illustrated and described, that while the stabilizers and elevators 46, 47 respectively, may be initially or temporarily adjusted or set, the tail structure as a unit is free to move with the intermediate wing sections 17 and the tail booms 40.

Figure 7:
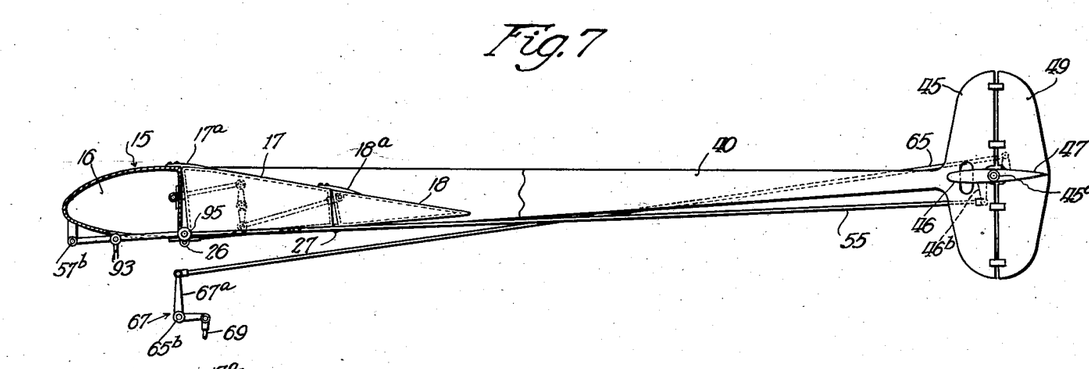
Fig. 7 is a diagrammatical view of one side showing one position of the wing sections, tail structure, control rods and elevator and stabilizer.
Figures 9, 10:
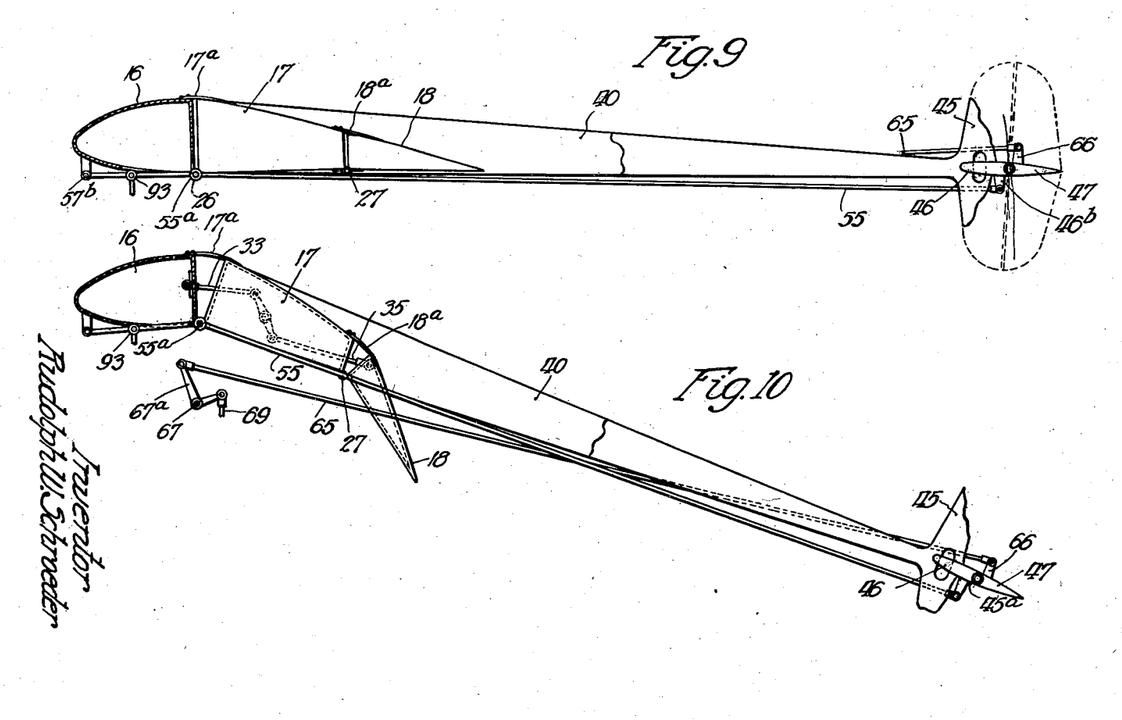
Fig. 9 is a view similar to Fig. 7 showing the elements in still another position.
Fig. 10 is a view similar to Fig. 8 showing a different position of the controls, stabilizer and elevator.
Figure 11:
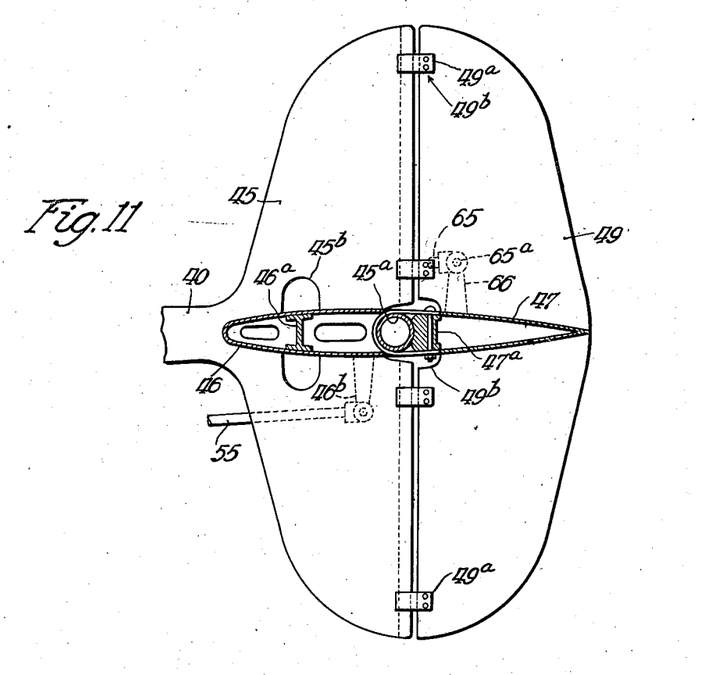
Fig. 11 is a side elevation partially in section of the tail structure.
Figure 12:
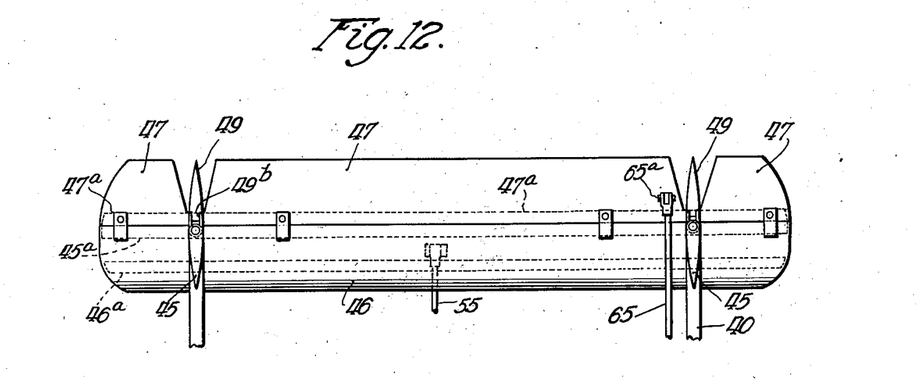
Fig. 12 is a plan view of the same.

It will also be apparent that the camber of the wings may be varied within considerable limits by relative or articulated movement of the sections of such wings as, for example, in Fig. 7 the camber of the wings or the relative location of the chord line thereof is adapted to produce maximum speed efficiently while the camber of the wings as illustrated in Fig. 9 is adapted to a lesser or more economical cruising speed under less than maximum power. The camber of the wing as illustrated in Fig. 10 produces a relatively great lift and would obviously prevent the attaining of high speed due to consequent increased drag.

Figure 8:
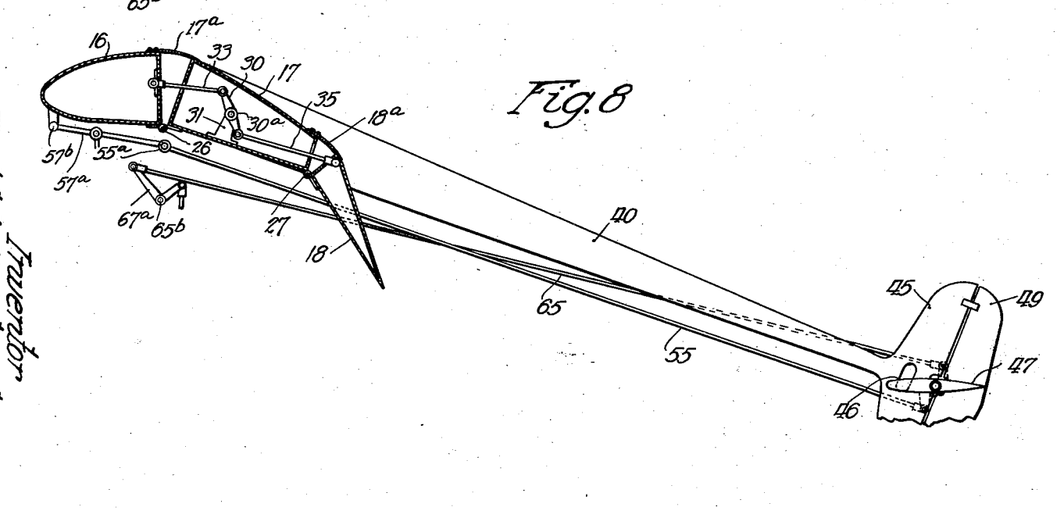
Fig. 8 is a view similar to Fig. 7 showing the same elements in another position.

In the operation of the plane described, under typical conditions, in starting from rest with closed throttle and the control stick in neutral, as illustrated in Fig. 2, the tail will probably be in downwardly inclined position as illustrated in Fig. 8, but with the stabilizers and elevators depressed somewhat, as illustrated in Fig. 2. The brakes would be on, the motor idling with a substantially closed throttle and the car supported on the tips 14 and the wheels 11. If the throttle now be opened fully or to normal flying speed position, the pivotal axis 55ª is moved to coincidence with the hinged axis 26 about which the tail structure pivots. This lifts the stabilizers in substantial alignment with the axis of the tail structure, or in what might be termed their normal position relative to the tail axis or structure, leaving the elevators still depressed. Thereupon the current from the propeller striking the depressed elevators will raise the tail structure about its hinged axis and move the intermediate and tail wing sections correspondingly. This movement of the tail structure has no effect upon the position of the stabilizers because of the coincidence between pivotal point 55ª and hinged axis 26. Such movement, however, the control stick being held in neutral, results in movement of the elevators to co-axial alignment with the tail structure. This brings the movable elements to substantially the same position which is maintained during straightaway flying.

The brakes may now be released and the plane be permitted to travel along the ground. The control lever is pulled back, which raises the elevators 47, leaving the stabilizers still in substantial alignment with the axis of the tail structure. This movement of the elevators presents a surface against which the current of air or "slipstream" from the propeller now impinges which depresses the tail structure and varies the camber of the wing sections to or toward a condition such as that illustrated in Fig. 10. This presents a wing camber of great relative lift and the plane will quickly and steeply ascend from the ground.

By setting the horizontal stabilizer to obtain what is sometimes termed a "negative" tail, i. e., in such position as to receive a downward thrust from the air current, the plane may effect its climbing without actuation of the control stick by the operator, as the "negative" tail will function as the air speed increases to depress the tail booms and thereby increase the camber of the wings, which will then function to quickly raise the plane from the ground as the necessary speed is reached.

The pilot may then obtain different kinds of flight conditions as he desires. By throttling down the motor until the wing lift is equal to the total weight, relatively slow level flight may be obtained.

On the other hand, the throttle may be maintained at "full-on" position or approximately so and the control stick actuated to actuate the elevator to lift the tail and to thereby vary the wing camber to a position similar to that illustrated in Fig. 2 or 9, in which high speed level flight will be obtained. Also, what is sometimes termed "cruising" speed may be obtained by setting the throttle for economical power development with such actuation of the control stick as to obtain level flight, or if the pilot wishes to obviate having to hold the control stick out of normal position, the stabilizer may be "trimmed" or adjusted by the hand-wheel 90 to obtain this result, as for long across country flights.

With the construction illustrated and described, the plane automatically tends to maintain constant air speed. Should the power developed decrease, due to throttle manipulation or missing or on account of some other failure of the motor, the resultant air effect upon the stabilizer is decreased and the tail rises, whereupon the camber of the wings is varied and less lift is exerted so that the plane tends to lessen its angle of climb or starts to descend until the air effect upon the stabilizer again varies the camber to reduce such speed. This result is obtained with the "negative" tail referred to above.

This action is assisted by the action of the elevators which are raised as the tail rises and thereby limit and correct the effect of the stabilizer, as for example, when the power effort is decreased and the tail rises decreasing the negative effect thereof, the elevator will be raised relative to the stabilizer which results in a "negative" action from the impact of the air upon the stabilizer, and this tends to force the tail down and prevent a sudden diving action of the plane.

Of course, these actions may be eliminated or varied by proper manipulation of the control stick to obtain the character of flight desired. It will be apparent that with the throttle in substantially "full-on" position the pivotal point 55ª is in substantial coincidence with the hinge axis 26, and the stabilizer position remains substantially constant relative to the tail structure, but its absolute position, i. e., with respect to the air, varies with variations in the position of the tail. During the maintenance of such throttle condition the elevator position both relative and absolute may be varied by manipulation of the control stick or by movement of the tail.

On the other hand, with the throttle in closed position as illustrated in Fig. 2, both relative and absolute positions of the horizontal stabilizer may be varied upon movement of the tail.

One advantage of this arrangement is in descent, when by lowering the tail through manipulation of the control stick the lift of the plane is increased as is its drag and a steeper glide at less speed results, while the stabilizer has been moved down to continue its negative effect to compensate for the decreased slip-stream to neutralize or partially neutralize the diving effect of the load acting at the center of gravity.

This automatic functioning of the stabilizer when it has once been set is highly advantageous, as it automatically varies its stabilizing effort to meet varying conditions of flight, and manual "trimming" of the stabilizer during flight is obviated, except, as described, for long level flights.

The center of gravity of the fuselage being located substantially in a vertical plane through the hinge axis 26, and such fuselage being rigidly connected to the nose wing sections 16, the angular relation of the fuselage with respect to the earth remains substantially constant during ascent and level flight, thereby preventing the shift of center of gravity of the suspended structure forwardly during ascent, which would have the effect of eliminating a tendency to nose over as the center of support of the wings moves backwardly under ascent as in present-day construction. Obviously, it may be desirable to make sudden dives, as for example to prevent a head-on collision with another plane, and in such event the pilot needs merely to push forward on his control stick, sharply depressing the elevators 47, which will quickly nose the plane downwardly, the fuselage temporarily tilting likewise so as to shift the center of gravity rearwardly with respect to the center of pressure. This shift of the center of gravity eliminates or partially neutralizes the diving moment which otherwise obtains, and tends to bring the plane out of the dive. Also, as the speed of the plane while diving increases, the negative effect of the stabilizer is increased, and this also acts to bring the plane out of the dive, so that there are two actions which limit the length or time of such a sharp diving action, but which nevertheless permit at least a short emergency dive.

It should be noted that I have arranged the car in substantial parallelism with the axis of the wing nose sections and it is normally maintained in substantial parallel relation to the ground during ascent and descent so that it is possible to land at a relatively sharp angle if this becomes necessary or desirable. This is in contradistinction from present-day planes in which the car is inclined with the wings relative to the ground in ascent or descent and consequently it is impossible to make what is commonly termed a "three-point" landing without leveling off.

It will be apparent that my invention is susceptible to modification and departure from the embodiment illustrated and described, and I do not wish to be restricted to the form shown and described except as defined in the appended claims, with due consideration for full range of equivalents of the elements and combinations recited therein.

What I claim is:—

1. An airplane provided with a wing comprising articulated sections, a fuselage rigidly formed with one of said sections, and a tail structure movable with another of said sections relative to the wing section to which said fuselage is attached.

2. An airplane comprising a wing, a relatively movable tail structure, a pivotally mounted stabilizer associated with said tail structure, control means for said stabilizer, said control means being constructed and arranged for movement into and out of position wherein said stabilizer will remain relatively fixed with respect to said tail structure.

3. An airplane comprising a wing, a pivotally mounted tail structure, a pivotally mounted stabilizer associated with said tail structure, and control means for said stabilizer including an actuating member movable into and out of coincidence with the axis of pivotal movement of said tail structure.

4. An airplane comprising a wing, said wing being formed of articulated sections, a tail structure pivotally mounted to move with one of said sections, a pivotally mounted stabilizer associated with said tail structure, and means to control said stabilizer, said means including a member movable into and out of coincidence with the axis of pivotal movement of said tail structure.

5. An airplane comprising a wing, said wing being formed of articulated sections, a tail structure pivotally mounted to move with one of said sections, a pivotally mounted stabilizer associated with said tail structure, means to control said stabilizer, said means including a member movable into and out of coincidence with the axis of pivotal movement of said tail structure, and a throttle controlling means operatively connected to said member to move the same into and out of such coincidence.

6. An airplane comprising a wing formed of articulated sections, a fuselage connected to one of said sections, a tail structure connected to another of said sections and movable therewith, said tail structure being provided with an adjustable stabilizer and an adjustable elevator.

7. An airplane comprising a wing, a power plant, a fuselage, said wing being formed of articulated sections, said fuselage and power plant being attached to one of said sections, a tail structure attached to another of said sections to move therewith, a pivotally mounted stabilizer associated with said tail structure, and means operable upon movement of said tail structure to relatively move said stabilizer.

8. An airplane comprising a wing, a power plant, a fuselage, said wing being formed of articulated sections, said fuselage and power plant being attached to one of said sections, a tail structure attached to another of said sections to move therewith, a pivotally mounted elevator associated with said tail structure, and means operable upon movement of said tail structure to relatively move said elevator.

9. An airplane comprising a wing, a power plant, a fuselage, said wing being formed of articulated sections, said fuselage and power plant being attached to one of said sections, a tail structure attached to another of said sections to move therewith, a pivotally mounted stabilizer associated with said tail structure, means operable upon movement of said tail structure to relatively move said stabilizer, a pivotally mounted elevator associated with said tail structure, and means operable upon movement of said tail structure to relatively move said elevator.

10. An airplane comprising a wing, a power plant, a fuselage, said wing being formed of articulated sections, said fuselage and power plant being attached to one of said sections, a tail structure attached to another of said sections to move therewith, a pivotally mounted stabilizer associated with said tail structure, and means operable upon movement of said tail structure to relatively move said stabilizer, said means being operable at will to retain said stabilizer in fixed position with respect to said tail structure.

11. An airplane comprising a wing, a power plant, a fuselage, said wing being formed of articulated sections, said fuselage and power plant being attached to one of said sections, a tail structure attached to another of said sections to move therewith, a pivotally mounted stabilizer associated with said tail structure, means operable upon movement of said tail structure to relatively move said stabilizer, and throttle controlling means operatively attached to said stabilizer control means and operable to render said stabilizer control means either operative or inoperative to vary the position of said stabilizer relative to said tail structure.

12. An airplane comprising a source of power, a propelling member actuated thereby, a wing formed of sections, said sections being hingedly connected, said source of power being rigidly attached to one of said sections in such wise that the actuating force of said propelling member will act along a line substantially through the hinged connection between the section to which said source of power is attached and the adjacent section.

13. An airplane comprising a source of power, a propelling member actuated thereby, a wing formed of sections, said sections being hingedly connected, said source of power being rigidly attached to one of said sections in such wise that the actuating force of said propelling member will act along a line substantially through the hinged connection between the section to which said source of power is attached and the adjacent section, and a fuselage also attached to said section to which said source of power is attached with its center of gravity substantially underlying said hinged connection.

14. An airplane including a wing, said wing being formed of a plurality of hingedly connected sections, a stabilizer, and means including a rod operatively attached to said stabilizer to adjust the position of the same, one point of said rod being movable into and out of coincidence with the axis of hinging of said sections.

15. An airplane including a wing, said wing being constructed with three hingedly connected sections, a fuselage rigidly attached to the mounted section of said wing, and a tail structure rigidly attached to another of said sections, all of said sections being interconnected whereby relative movement of one of said sections will relatively move the others of said sections.

16. An airplane including a wing, said wing being formed of at least two hingedly connected sections, a fuselage attached to one of said sections, a tail structure attached to another section thereof and movable therewith, said tail structure being provided with a pivotally mounted stabilizer, controlling means for said stabilizer, and means to render said controlling means either operative or inoperative to move said stabilizer relative to said tail structure upon movement of the latter.

17. An airplane comprising a wing, said wing being formed of a plurality of hingedly connected sections, means operatively connecting said sections to relatively move them all upon movement of one, a source of power, and a fuselage attached to one of said sections, a tail structure attached to another of said sections and movable therewith, said tail structure being provided with a pivotally mounted stabilizer, and means to vary the position of said stabilizer relative to said tail structure.

18. An airplane comprising a wing formed of articulated sections, a fuselage attached to one of said sections, a tail structure attached to another of said sections to move therewith, and means to retard or dampen the movement between said sections.

19. An airplane comprising a wing formed of hingedly connected sections, a fuselage attached to one of said sections, a tail structure attached to another of said sections to move therewith, a pivotally mounted stabilizer associated with said tail structure, a pivotally mounted elevator associated with said tail structure, controlling means accessible from said fuselage for relative movement of said stabilizer, and controlling means accessible from said fuselage for movement of said elevator.

20. An airplane comprising a wing formed of hingedly connected sections, a fuselage attached to one of said sections, a tail structure attached to another of said sections to move therewith, a pivotally mounted stabilizer associated with said tail structure, a pivotally mounted elevator associated with said tail structure, controlling means accessible from said fuselage for relative movement of said stabilizer, controlling means accessible from said fuselage for movement of said elevator, and throttle controlling means operatively attached to said stabilizer controlling means and operable to render the latter either operative or inoperative for stabilizer movement.

21. An airplane comprising a wing, said wing being formed of articulated sections, a fuselage attached to one of said sections, a tail structure attached to another of said sections to move therewith, a pivotally mounted stabilizer associated with said tail structure, and means operable upon movement of said tail structure to vary the relative position of said stabilizer with respect thereto.

22. An airplane comprising a wing, said wing being formed of articulated sections, a tail structure attached to one of said sections to move therewith, a pivotally mounted stabilizer and a pivotally mounted elevator associated with said tail structure, and means to effect movement of said stabilizer and elevator in opposite directions upon movement of said tail structure.

23. An airplane comprising a wing formed of articulated sections, a fuselage attached to said wing, a tail structure attached to one of said wing sections and movable therewith relative to said fuselage, a pivotally mounted stabilizer associated with said tail structure, a pivotally mounted elevator also associated with said tail structure, and controlling means for said stabilizer and controlling means for said elevator, each of said means being operable upon movement of said tail structure to effect movement of said stabilizer and elevator, said stabilizer controlling means being arranged for operation or inoperation at the will of the operator.

24. An airplane comprising a wing formed of articulated sections, a fuselage attached to said wing, a tail structure attached to one of said wing sections and movable therewith relative to said fuselage, a pivotally mounted stabilizer associated with said tail structure, a pivotally mounted elevator also associated with said tail structure, and controlling means for said stabilizer and controlling means for said elevator, each of said means being operable upon movement of said tail structure to effect movement of said stabilizer and elevator in opposite directions.

25. An airplane comprising a wing formed of a plurality of articulated sections, a fuselage and a power plant attached to the nose section of said wing, a tail structure attached to the intermediate section of said wing and movable therewith, and means to impart relative movement to the trailing section of said wing upon movement of said intermediate section with said tail relative to said nose section.

26. An airplane comprising a wing of variable camber, a fuselage carried by said wing, and a tail structure associated with said wing, said tail structure being relatively movable with respect to said fuselage to vary the camber of said wing.

27. An airplane comprising a wing of variable camber, a fuselage carried by said wing, a tail structure associated with said wing, said tail structure being relatively movable with respect to said fuselage to vary the camber of said wing, and means actuatable to effect such movement of said tail structure.

28. An airplane comprising a wing of variable camber, a fuselage carried by said wing, a tail structure associated with said wing, said tail structure being relatively movable with respect to said fuselage to vary the camber of said wing, and means actuatable to effect such movement of said tail structure, the last named means including a stabilizer and means to vary the position of the same relative to said tail structure, said last named means being operable at will to retain said stabilizer in fixed relation to said tail structure during movement thereof.

29. An airplane comprising a wing of variable camber, a fuselage carried by said wing, a tail structure associated with said wing, said tail structure being relatively movable with respect to said fuselage to vary the camber of said wing, and means actuatable to effect such movement of said tail structure, said means including a pivotally mounted stabilizer and a pivotally mounted elevator.

30. An airplane comprising a wing of variable camber, a fuselage carried by said wing, a tail structure associated with said wing, said tail structure being relatively movable with respect to said fuselage to vary the camber of said wing, means actuatable to effect such movement of said tail structure, said means including a pivotally mounted stabilizer and a pivotally mounted elevator, means to effect adjustment of the relative position of said stabilizer, and means to effect adjustment of the relative position of said elevator, said stabilizer adjusting means being operable at will to retain said stabilizer in fixed relative position with respect to said tail structure during movement thereof.

31. An airplane comprising a wing of variable camber, a fuselage carried by said wing, a tail structure associated with said wing, said tail structure being relatively movable with respect to said fuselage to vary the camber of said wing, means actuatable to effect such movement of said tail structure, said means including a pivotally mounted stabilizer and a pivotally mounted elevator, and means associated with said stabilizer and with said elevator to effect relative movement of each with respect to said tail structure upon movement of said tail structure relative to said fuselage.

32. An airplane comprising a wing of variable camber, a fuselage carried by said wing, a tail structure associated with said wing, said tail structure being relatively movable with respect to said fuselage to vary the camber of said wing, means actuatable to effect such movement of said tail structure, said means including a pivotally mounted stabilizer and a pivotally mounted elevator, and means associated with said stabilizer and with said elevator to effect relative movement of each with respect to said tail structure upon movement of said tail structure relative to said fuselage, said stabilizer movement effecting means being operable at will to retain said stabilizer in fixed relative position with respect to said tail structure during movement thereof.

33. An airplane comprising a wing, said wing being of variable camber, a fuselage carried by said wing, a tail structure associated with said wing and movable to effect variation in the camber thereof, a pivotally mounted stabilizer associated with said tail structure, and means to vary the relative position of said stabilizer upon movement of said tail structure relative to said fuselage.

34. An airplane comprising a wing, said wing being of variable camber, a fuselage carried by said wing, a tail structure associated with said wing and movable to effect variation in the camber thereof, a pivotally mounted stabilizer associated with said tail structure, means to vary the relative position of said stabilizer upon movement of said tail structure relative to said fuselage, and means to manually actuate said stabilizer moving means.

35. An airplane comprising a wing, said wing being formed of articulated sections, a fuselage attached to one of said sections, a tail structure attached to another of said sections to move therewith, a pivotally mounted stabilizer asociated with said tail structure, means operable upon movement of said tail structure to vary the relative position of said stabilizer with respect thereto, and means to manually adjust the relative position of said stabilizer.

36. An airplane comprising a wing of variable camber, a fuselage carried by said wing, and a tail structure associated with said wing, said tail structure being relatively movable with respect to said fuselage to vary the camber and chord line of said wing.

37. An airplane comprising a transverse wing, a power plant, a fuselage carried by said wing, a tail structure extending from said wing, a transverse member carried by said tail structure, an elevator rotatable about the axis of said transverse member, and a horizontal stabilizer also rotatable about the axis of said member.

38. An airplane comprising a transverse wing, a power plant, a fuselage carried by said wing, a tail structure extending from said wing, a transverse member carried by said tail structure, an elevator rotatable about the axis of said transverse member, and a horizontal stabilizer also rotatable about the axis of said member, said stabilizer and elevator being complementary in their actions.

39. An airplane comprising a wing, a fuselage carried thereby, a tail piece movable relative to said fuselage, a pivotally mounted stabilizer carried by said tail structure, a crank member attached to said stabilizer, an actuating rod leading therefrom, and actuating means operatively associated with said rod to actuate said stabilizer, one point if said rod being movable into and out of coincidence with the axis of relative movement of said tail structure.

40. An airplane comprising a wing, a fuselage carried thereby, a tail piece movable relative to said fuselage, a pivotally mounted stabilizer carried by said tail structure, a crank member attached to said stabilizer, an actuating rod leading therefrom and actuating means operatively associated with said rod to actuate said stabilizer, said last named means including a throttle controlling means.

41. An airplane comprising a wing, a source of power, speed control means to vary the power delivered from said source, a fuselage carried by said wing, a tail structure relatively movable with respect to said fuselage, a stabilizer carried by said tail structure, means to vary the relative position of said stabilizer upon relative movement of said tail structure, and means to render said last named means inoperative at a desired condition of said speed control means.

42. An airplane including a wing, a source of power, a stabilizer, means to vary the position of said stabilizer, and a throttle controlling means directly connected to said stabilizer varying means whereby movement of the throttle controlling means operates the stabilizer varying means.

In testimony whereof, I have signed my name to this specification.

RUDOLPH W. SCHROEDER.